(12) United States Patent
Bauer et al.

(10) Patent No.: US 10,766,355 B2
(45) Date of Patent: Sep. 8, 2020

(54) MOTOR VEHICLE WITH AIR-DIRECTING COMPONENT

(71) Applicant: Dr. Ing. h.c. F. Porsche Aktiengesellschaft, Stuttgart (DE)

(72) Inventors: Riccardo Bauer, Owen (DE); Tobias Posch, Wimsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 92 days.

(21) Appl. No.: 16/137,557

(22) Filed: Sep. 21, 2018

(65) Prior Publication Data

US 2019/0111775 A1 Apr. 18, 2019

(30) Foreign Application Priority Data

Oct. 17, 2017 (DE) .......................... 10 2017 124 107

(51) Int. Cl.
*B60K 11/04* (2006.01)
*B60K 11/08* (2006.01)
*B60K 5/00* (2006.01)

(52) U.S. Cl.
CPC ........ *B60K 11/08* (2013.01); *B60K 2005/006* (2013.01)

(58) Field of Classification Search
CPC .................................................... B60K 11/08
See application file for complete search history.

(56) References Cited

U.S. PATENT DOCUMENTS

| 2,143,889 | A | * | 1/1939 | Hans | B60K 11/06 |
| | | | | | 180/68.1 |
| 2,194,396 | A | | 3/1940 | Milos | |
| 3,791,471 | A | * | 2/1974 | Buser | B60K 11/08 |
| | | | | | 180/68.1 |
| 4,690,204 | A | * | 9/1987 | Reichel | F01P 11/10 |
| | | | | | 123/41.62 |
| 4,889,382 | A | | 12/1989 | Burst et al. | |
| 4,992,071 | A | * | 2/1991 | Suto | A63H 29/24 |
| | | | | | 310/61 |
| 7,201,432 | B2 | * | 4/2007 | Roth | B62D 35/007 |
| | | | | | 296/180.5 |
| 2004/0238246 | A1 | | 12/2004 | Ceccarani et al. | |
| 2011/0000727 | A1 | * | 1/2011 | Froeschle | B60J 1/2008 |
| | | | | | 180/68.1 |

(Continued)

FOREIGN PATENT DOCUMENTS

AT 158094 B 3/1940
CH 205723 A 6/1939

(Continued)

*Primary Examiner* — James A Shriver, II
*Assistant Examiner* — James J Triggs
(74) *Attorney, Agent, or Firm* — Leydig, Voit & Mayer, Ltd.

(57) ABSTRACT

A motor vehicle includes a rear region, a covering, a drive system arranged in the rear region, and an air-directing component arranged above the drive system. The air-directing component is configured to direct an air flow along a first side of the air-directing component. The drive system is arranged below the covering. At least one recess is arranged on a second side of the air-directing component, the at least one recess being configured to provide an air flow under the covering in the direction of the drive system.

9 Claims, 4 Drawing Sheets

(56) References Cited

U.S. PATENT DOCUMENTS

2016/0229285 A1   8/2016   Rutschmann et al.

FOREIGN PATENT DOCUMENTS

| DE | 648055 C | 7/1937 |
| DE | 738270 C | 8/1943 |
| DE | 3615584 A1 | 11/1978 |
| DE | 102007054824 A1 | 5/2009 |
| DE | 102008061391 A1 | 6/2010 |
| DE | 102009031253 A1 | 1/2011 |
| DE | 102009039773 A1 | 3/2011 |
| DE | 102015101797 A1 | 8/2016 |
| EP | 1420971 B1 | 5/2004 |

* cited by examiner

A - A

MOTOR VEHICLE WITH AIR-DIRECTING COMPONENT

CROSS REFERENCE TO RELATED APPLICATIONS

This application claims benefit to German Patent Application No. DE 10 2017 124 107.8, filed Oct. 17, 2017, which is hereby incorporated by reference herein.

FIELD

The invention relates to a motor vehicle with a rear region, a covering, a drive system arranged in the rear region and an air-directing component arranged above the drive system.

BACKGROUND

Motor vehicles with a drive system in the rear region are known from the prior art. The drive system can be, for example, an internal combustion engine. It is also known that an air-directing structure is arranged above said drive system and is intended to contribute to improving the driving performance of the motor vehicle. The air-directing structure can also be referred to, for example, as a spoiler.

DE 10 2015 101 797 A1 discloses a motor vehicle with an internal combustion engine and a charge air cooler, in which the air flow flowing around the motor vehicle is supplied to the charge air cooler.

SUMMARY

In an embodiment, the present invention provides a motor vehicle. The motor vehicle includes a rear region, a covering, a drive system arranged in the rear region, and an air-directing component arranged above the drive system. The air-directing component is configured to direct an air flow along a first side of the air-directing component. The drive system is arranged below the covering. At least one recess is arranged on a second side of the air-directing component, the at least one recess being configured to provide an air flow under the covering in the direction of the drive system.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
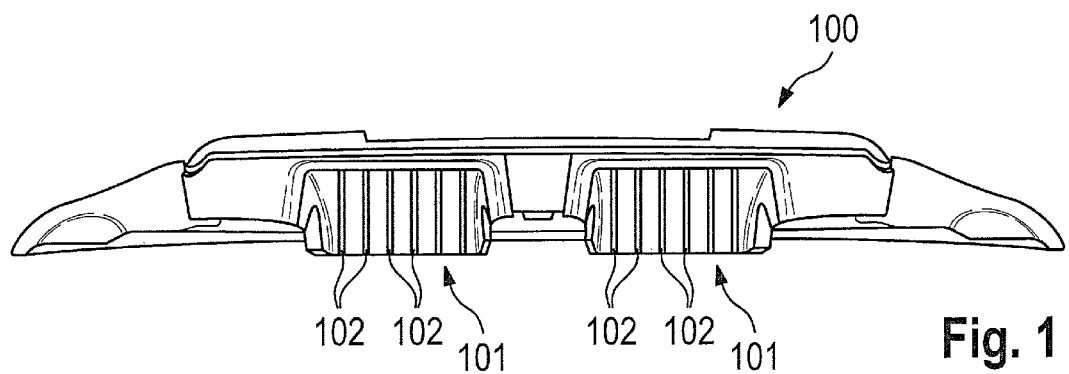
FIG. 1 shows a schematic perspective view of air-directing structures according to an embodiment of the invention.

Embodiments of the present invention provide a motor vehicle with a simplified structure for guiding air.

Motor vehicles according to embodiments of the invention include a rear region, a covering, a drive system arranged in the rear region, and an air-directing structures, which is arranged above the drive system, for directing an air flow. The air flow is preferably directed along a first side of the air-directing structures. The first side is preferably an upper side of the air-directing structures. The drive system is arranged below the covering. The covering can therefore be arranged between the drive system and the air-directing structures. The air-directing structures have, at least on a second side, a recess through which air can flow under the covering in the direction of the drive system.

By way of the recess on the second side, a possibility integrated in the air-directing structures is provided for guiding the air to the drive system. The structures for guiding air to the drive system are therefore simplified.

According to one embodiment of the invention, air-guiding structures can be arranged within the recess. Said air-guiding structures can be designed to the effect that air flowing into the recess from outside the motor vehicle is guided to the drive system. The air-guiding structures therefore improve the air flow to the drive system.

According to one embodiment of the invention, the air-guiding structures can have reinforcing ribs for increasing the mechanical stability of the air-guiding structures.

According to one embodiment of the invention, the drive system can comprise an internal combustion engine and a charge air cooler. The air-guiding structures can be arranged in such a manner that the air flowing into the recess is guided to the charge air cooler. The air flowing through the recess can therefore be used as additional air for the charge air cooler.

According to one embodiment of the invention, the air-directing structures can be designed in order, during operation of the motor vehicle, to direct the air flow in such a manner that a downwardly directed force acts on the air-directing structures by way of the air flow. This can be achieved, for example, by a suitable shape of the surface with which the air flow is directed. The downwardly directed force influences the driving performance of the motor vehicle, in particular during cornering, positively.

According to one embodiment of the invention, the air-directing structures can comprise a lower part and an upper part. The lower part here has the recess. It is possible in particular that the lower part and the upper part are two separate components.

According to one embodiment of the invention, the air-directing structures can have a plurality of recesses. The air-guiding structures can be arranged within each of the recesses.

According to one embodiment of the invention, the reinforcing ribs can be formed integrally with a basic body. The basic body can connect the reinforcing ribs to one another. The reinforcing ribs can be arranged on one side of the basic body. Depressions can in each case be arranged on the basic body opposite the reinforcing ribs.

The depressions arranged opposite the reinforcing ribs can be advantageous in particular in order, in the production process, to avoid sink marks which may arise in particular during the injection molding. The wall thickness ratio can be kept approximately the same.

According to one embodiment of the invention, the reinforcing ribs can be spaced apart from one another in a horizontal direction. The extent of the depressions in said horizontal direction at least approximately can correspond to the extent of the respectively opposite reinforcing rib in the same direction. The wall thickness ratio is thereby kept approximately constant in order to reduce the risk of sink marks during the production process.

Figure 8:
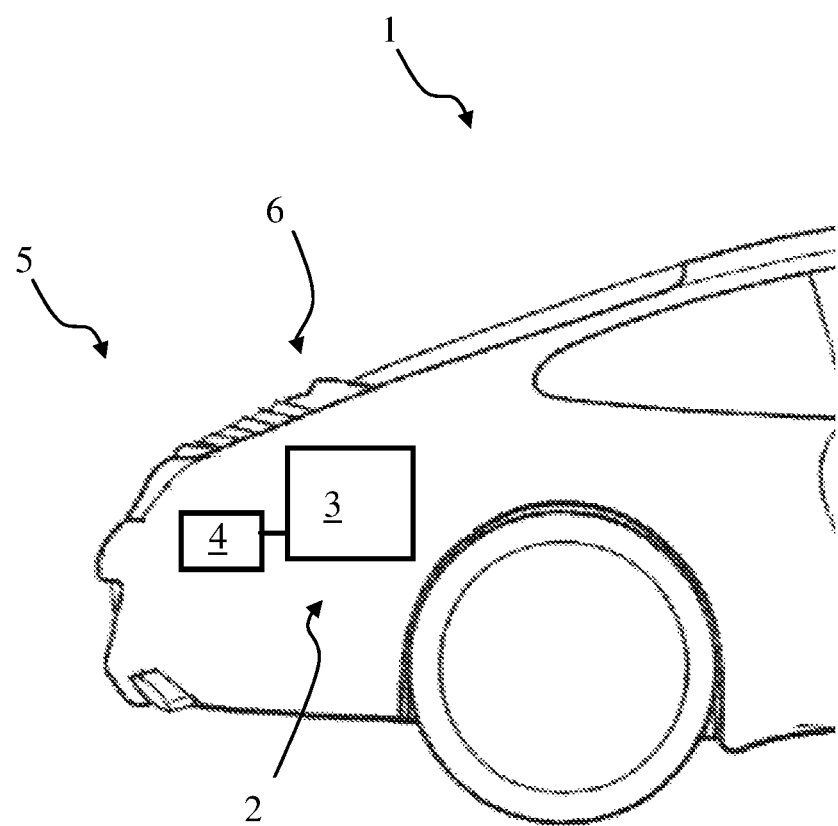
FIG. 8 shows a graphical representation of a motor vehicle.

FIG. 8 shows a graphical representation of a motor vehicle 1. The motor vehicle 1, has a drive system 2, having an internal combustion engine 3 and a charge air cooler 4. The drive system 2 is in a rear region 5 of the motor vehicle 1. An air directing component 6 is arranged above the drive system 6.

Figure 2:
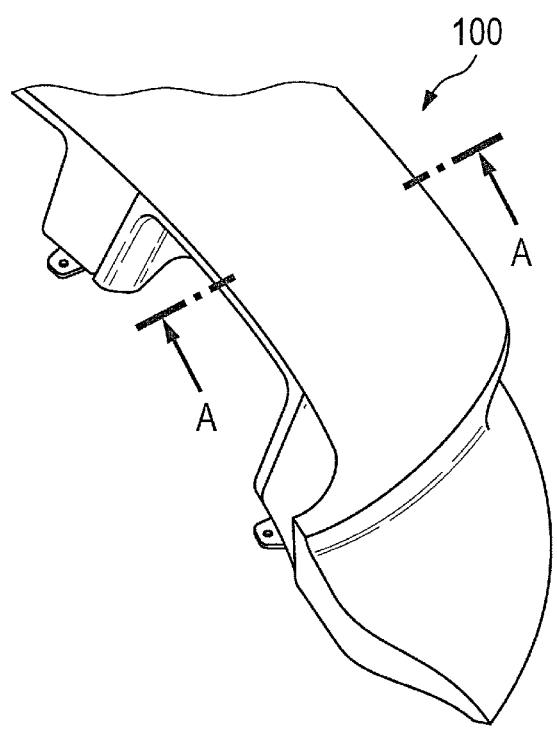
FIG. 2 shows a schematic perspective view of the upper side of the air-directing structures of FIG. 1.
Figure 3:
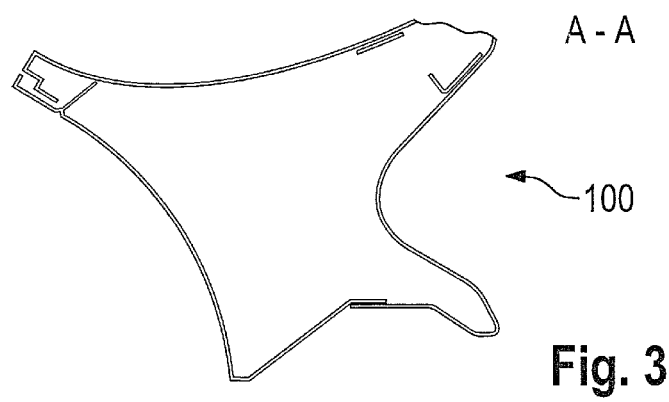
FIG. 3 shows a schematic sectional view along the intersecting line A-A from FIG. 2.
Figure 4:
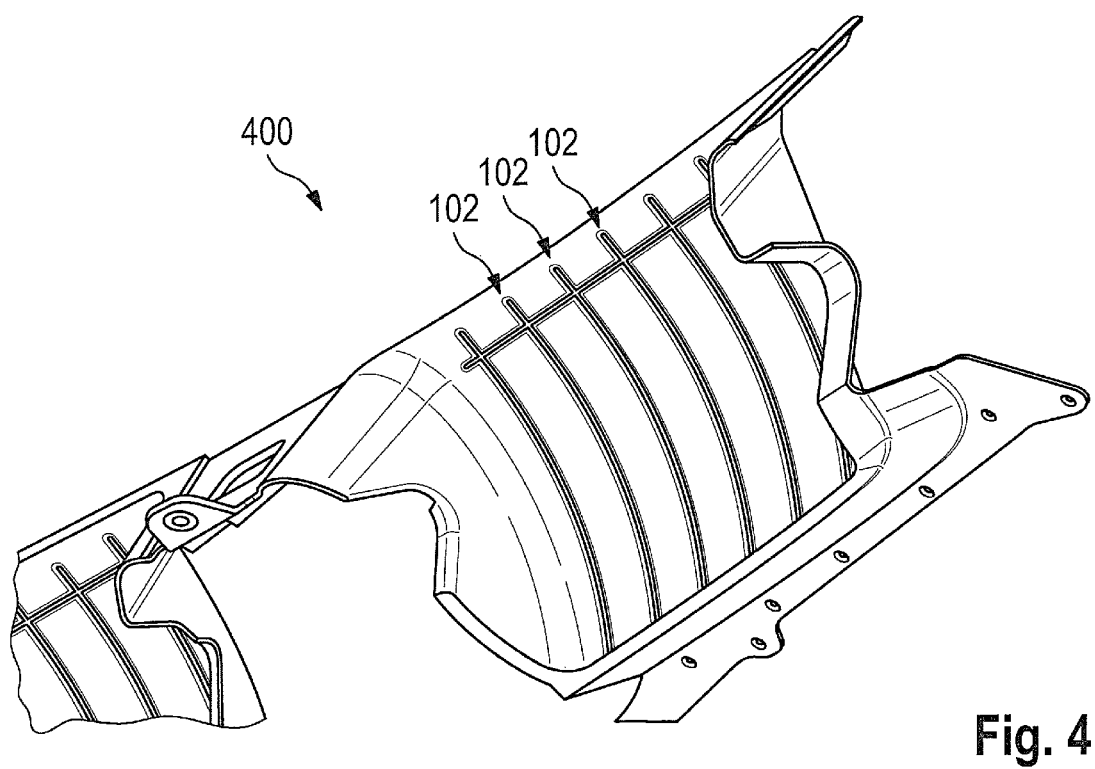
FIG. 4 shows a schematic perspective view of air-guiding structures according to one embodiment of the invention.
Figure 5:
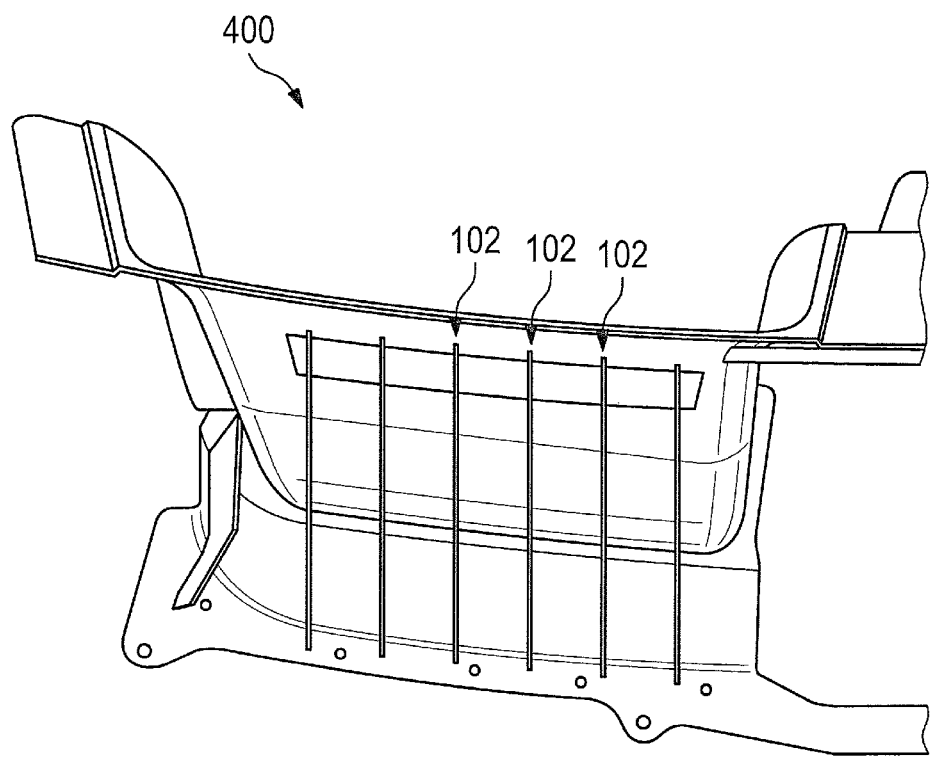
FIG. 5 shows a schematic perspective view of air-guiding structures according to one embodiment of the invention.
Figure 6:
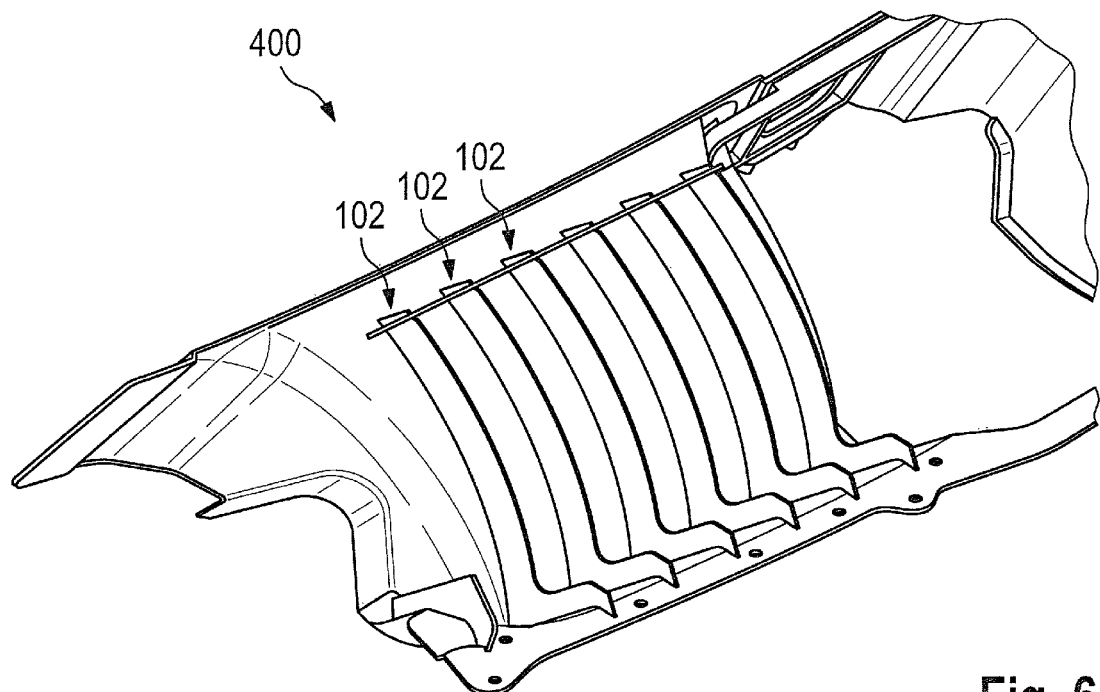
FIG. 6 shows a schematic perspective view of air-guiding structures according to one embodiment of the invention.

The air-directing component 100 has an upper side which is used for directing an air flow (see, for example, FIG. 2). The air flow here is directed in such a manner that a downwardly directed force acts on the air-directing component 100, as a result of which the driving performance of the motor vehicle is improved.

The air-directing component 100 has, outside the upper side, two recesses 101 through which incoming air can flow in the direction of a charge air cooler. For this purpose, air-guiding component 400 is arranged in the recesses 101 (see FIGS. 4 to 7). The air-guiding component 400 has reinforcing ribs 102 which increase the mechanical stability of the air-guiding component 400. In addition, the reinforcing ribs 102 can carry out air-directing functions.

Figure 7:
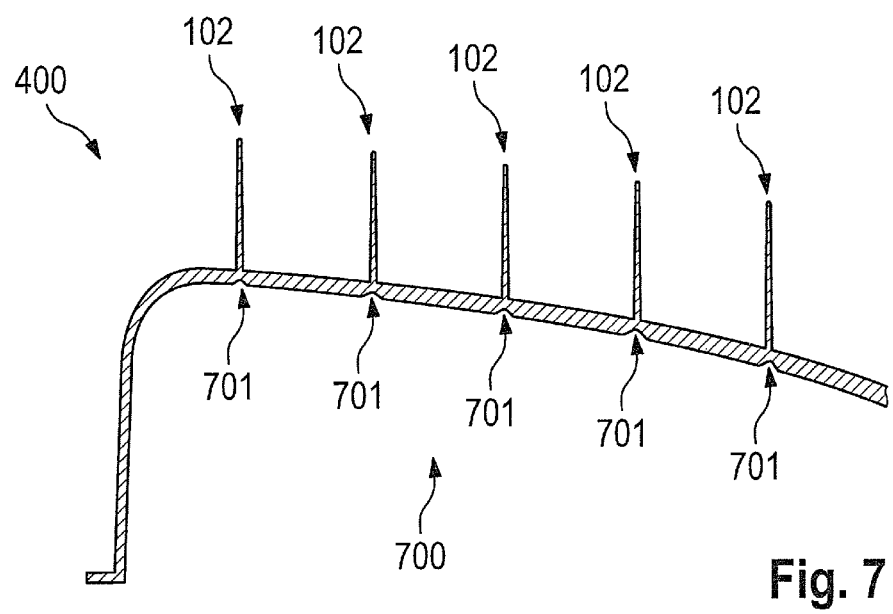
FIG. 7 shows a schematic top view of air-guiding structures according to one embodiment of the invention.

The air-guiding component 400 illustrated in FIG. 7 comprises a basic body 700 and the reinforcing ribs 102 arranged thereon. The reinforcing ribs 102 are spaced apart from one another in a horizontal direction. A depression 701 is in each case arranged on the basic body 700 opposite one of the reinforcing ribs 102. Said depressions 701 may also be referred to as thinned portions of the cross section of the basic body 700. Said thinned portions reduce the risk of sink marks occurring during the production process of the air-guiding component 400 since the wall thickness is kept approximately constant in this region.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A motor vehicle, comprising:
   a rear region;
   a covering;
   a drive system arranged in the rear region; and
   an air-directing component arranged above the drive system, the air-directing component being configured to direct an air flow along a first side of the air-directing component,
   wherein the drive system is arranged below the covering,
   wherein at least one recess is arranged on a second side of the air-directing component, the at least one recess being configured to provide an air flow under the covering in the direction of the drive system.

2. The motor vehicle as claimed in claim 1, wherein an air-guiding structure is arranged within the recess and is configured to guide air flowing into the recess from outside the motor vehicle to the drive system.

3. The motor vehicle as claimed in claim 1, wherein the air-guiding structure has reinforcing ribs for increasing the mechanical stability of the air-guiding structure.

4. The motor vehicle as claimed in claim 2, wherein the drive system comprises an internal combustion engine and a charge air cooler, wherein the air-guiding structure is configured to guide the air flowing into the recess to the charge air cooler.

5. The motor vehicle as claimed in claim 1, wherein the air-directing component is configured to, during operation of the motor vehicle, direct the air flow in such a manner that a the air flow exerts a downwardly directed force on the air-directing component.

6. The motor vehicle as claimed in claim 1, wherein the air-directing component includes a lower part and an upper part, wherein the lower part includes the at least one recess.

7. The motor vehicle as claimed in claim 1, wherein the air-directing component has a plurality of recesses, and wherein the air-guiding structure is arranged within each of the recesses.

8. The motor vehicle as claimed in claim 3, wherein the reinforcing ribs are formed integrally with a basic body, wherein the basic body connects the reinforcing ribs to one another, wherein the reinforcing ribs are arranged on one side of the basic body, and wherein depressions are in each case arranged on the basic body opposite the reinforcing ribs.

9. The motor vehicle as claimed in claim 8, wherein the reinforcing ribs are spaced apart from one another in a horizontal direction, wherein an extent of the depressions in the horizontal direction corresponds at least approximately to an extent of the respectively opposite reinforcing rib in the horizontal direction.

* * * * *